(No Model.)

J. T. BRAUND.
BURIAL PROCESS.

No. 376,629. Patented Jan. 17, 1888.

Witnesses
F. G. Fischer
M. Redman

Inventor
John T. Braund
By his Attorney
Chas. E. Barbur

N. PETERS, Photo-Lithographer, Washington, D. C.

UNITED STATES PATENT OFFICE.

JOHN T. BRAUND, OF MUSKEGON, MICHIGAN, ASSIGNOR OF ONE-HALF TO WILLIAM W. BARCUS, OF SAME PLACE.

BURIAL PROCESS.

SPECIFICATION forming part of Letters Patent No. 376,629, dated January 17, 1888.

Application filed February 24, 1887. Serial No. 228,678. (No model.)

*To all whom it may concern:*

Be it known that I, JOHN T. BRAUND, a subject of the Queen of Great Britain, residing at Muskegon, in the county of Muskegon and State of Michigan, have invented a new and useful Improvement in Burial Systems, of which the following is so full, clear, and exact a description as will enable others skilled in the art to which my invention appertains to make and use the same, reference being had to the accompanying drawings.

The object of my invention is to provide a burial system which will be so cheap and simple in construction as to be within the reach of the masses, while at the same time providing a means of disposing of the remains of the dead in such a manner that the spread of contagious diseases will be avoided, and the remains of the dead subject will be preserved for a long time without danger of their becoming offensive by decomposition.

Another object of my invention is to provide a burial system which will be in the interest of the public health, in consequence of there being no danger of poisoned or tainted drainage or deposits of water at points below the level of burial places, caused by the deposits of water which has permeated the corpses and then oozed through the ground and out into wells or other places where water is procured.

Another object of my invention is to provide a burial system and apparatus for use therewith which will be practically indestructible, thus enabling friends of the departed to preserve for a long time remains of the dead when it is desired to keep them any length of time or to ship them great distances.

Another object of my invention is to enable relatives, friends, and others to view the remains of the dead at long periods after death.

Another object of my invention is to provide a burial system which shall practically dispense with the necessity of the provision of expensive and elaborate vaults or permanent expensive structures of masonry; and to that end it consists in providing a composition sarcophagus which is practically air-tight and water-tight, as well as practically indestructible, and one which will not be affected by external physical elements or varying degrees of heat or cold or humidity.

With these general objects in view I proceed to carry out my invention in the manner hereinafter fully described, and particularly pointed out in the claims at the end of the specification.

Figure 2:
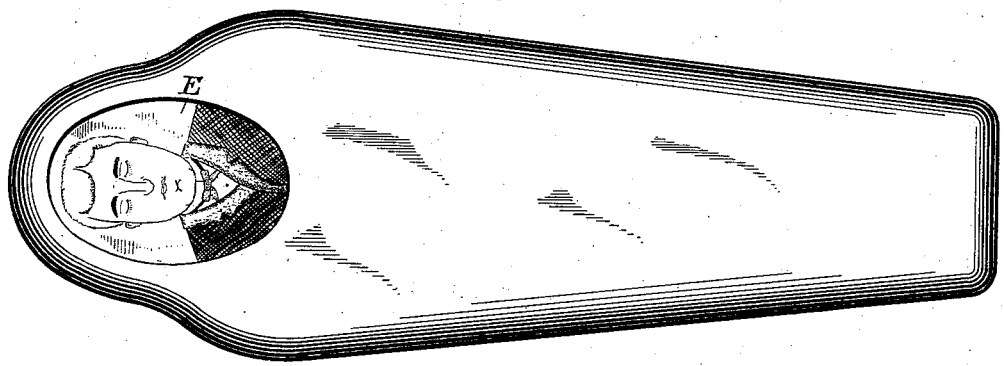
Figure 1:
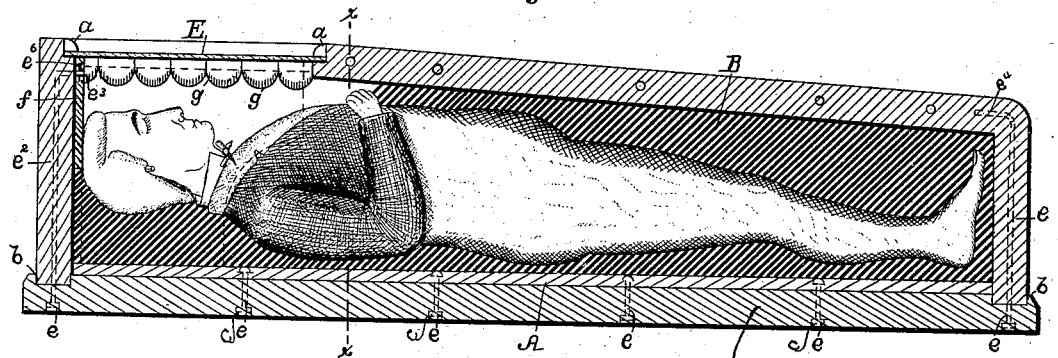
Figure 3:
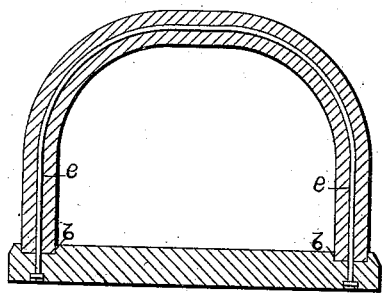
Figure 4:
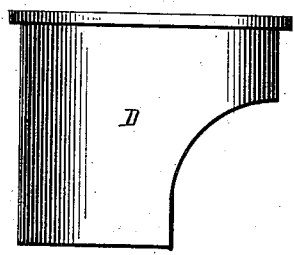

In the accompanying drawings, Figure 1 is a longitudinal horizontal sectional view of an improved burial casket or sarcophagus made by the use of my improved arrangement of elements and composition of matter. Fig. 2 is a top plan view of the same, showing it closed. Fig. 3 is a vertical section of the same, taken on the line *x x* of Fig. 1. Fig. 4 is a side view of a shield used in the process of preparing the corpse for interment in the sarcophagus, as will be hereinafter fully described.

In the accompanying drawings, A designates a board upon which the body is laid, the latter being supported in its natural position and the recesses and spaces between the body and the board filled in with tow or other suitable packing material, B, which is crowded in underneath the body, holding the head up in a natural position and filling in the little holes underneath the limbs and the recesses in the small of the back. The corpse is to be deposited in a casket, mold, or flask, which is to receive a plastic substance or cement, which will be hereinafter fully described.

The casket must be two inches larger in all directions than the body and board upon which the body rests. The spaces between the body and the inner edges of the flask and between and around the arms and legs, under the neck and head, and along under the sides, should be packed with wool, cotton, tow, wood-wool, or other fibrous material saturated preferably with glycerine or vaseline. The object of this packing is to exclude, as much as possible, air, round up the body, as well as to keep it from immediate contact with the sealing compound. The saturation with glycerine or vaseline is resorted to to facilitate the packing of the fibrous material more closely and to prevent the packing material from absorbing the moisture in the sealing compound. The body will also absorb to a great extent the glycerine and vaseline, which will largely prevent immediate wasting and shrinking of the tissues of the body.

On the inside of the casket or coffin is placed a layer, two inches thick, of mortar, asphalt, pitch, tar, resin, rubber, or other plastic compound, but preferably a cement, C, composed of one part sugar, five parts water-lime cement, with sufficient proportion of clean sharp sand and clean water. The exact proportion must be in all cases determined by the strength of the water-lime. The body lying upon the board A, having been prepared as described, is placed in the casket and upon the layer of still green or unset cement.

The use of sugar in the compound used for cement purposes prevents the cement from setting too quickly, and allows the particles composing the compound to set and knit more closely and firmly, making a less porous and more durable sarcophagus.

A round, oval, or other shaped shield or mold, D, is placed over and about the head and breast or other parts of the body. It may be constructed of wood, paper, rubber, or other substances, but preferably of sheet metal. The bottom of the molds or shields must conform to the shape of the pillow packing and parts of the body upon which it rests, and it will be made flat or straight upon its upper edge, which will have a projection around its upper edge and upon the outside. This projection is to form a rabbet in the sealing compound, into which a plate of glass, mica, or other transparent substance, E, is placed.

The object of the shield D is to protect the head, face, and bust from contact with the compound during and after the process is complete, and also to form the rabbet for the glass to be embedded in. The shield having been placed in position and a cover put over it, the space between the body and the walls of the casket is well packed with the cementing compound, before named, and between the walls of the casket and the shield will be well filled and packed with the cementing compound, the same to be carried up over the body and around the shield. When the cement shall have sufficiently set, the shield is withdrawn, and the plate of glass, mica, or other durable transparent substance is inserted into the rabbet formed around the opening made by the shield and sealed around its edges with the sealing compound, as shown at $a\ a$. The body is thus hermetically sealed in a receptacle of one solid block of artificial stone, which may be disposed of by vaulting or burying, as may be desired, or the body, after being prepared upon a board, as before described, may be placed in a casket or other shaped mold or flask, the bottom thereof having first received a layer of the sealing compound. The shield, Fig. 4, having been placed in position, the work of building in the compound is proceeded with, as above described, the shield is withdrawn, the glass E inserted and sealed. The mold or flask is taken from about the cement, leaving the body sealed in a solid block of artificial stone.

The mold or flask may be constructed to form panels, scrolls, or other ornament on the outside of the cemented form. The same may then be stained, painted, or ornamented, as desired.

In some instances the body is prepared in the ordinary way, and placed in an ordinary casket and taken to the place of interment. If for burial the rough box shall be sufficiently large, and, after having been placed in the grave, shall have a layer of cementing compound laid over its bottom. The casket containing the body will be laid upon the cement, and the whole built up and around over the top with the cementing compound. If for vaulting, instead of the rough box a flask or mold is used, and after the casket and contents have been sealed and the compound sufficiently set, then the flask is removed, and the sealed or cemented casket can be stained, grained, painted, enameled, or ornamented, as may be desired.

A mold may be used to form openings for glass, as described in the foregoing, only the bottom of the mold must be made to conform to the shape of the casket on the place on which it rests. When this is used and the sealed casket buried, a metallic plate of the same size and shape and of suitable thickness is placed over the glass to prevent the destruction of the same by the pressure of earth upon it.

Bodies may also be placed in and sealed in a casket formed or cast of the cementing compound in two pieces, as shown in Figs. 1, 2, and 3, the bottom being cast in one piece, formed with a dado or depression, $b$, around its outer edge, into which the sides are fixed. On the under side at proper intervals will be depressions to receive the nuts $c$, which fasten the upper section or body of the casket to the bottom. The sides, ends, and top are preferably cast in one piece, and are provided with metallic rods or arches $e\ e$ at suitable intervals. The rod or bolt at the foot will have a lug, $e^4$, bent on the upper end, which is to anchor it into the cement and resist the tension of the nut below. At and around the head the rods $e^2$ will have a lug, $e^3$, bent on their top ends. They will be flattened, have a vertical hole through them, and will extend through to the inside of the casket.

Attached to these lugs by a pin, $e^5$, will be a piece of wood, $f$, to which the trimmings $g$ around the head and face may be attached. In this system the rods or metallic arches and glass are placed and held in proper position, and the cementing compound cast around them, thus firmly fixing the glass, rods, and body of casket in one solid piece. The body to be sealed will be prepared upon a board in the same manner as formerly described, and laid upon the bottom piece of the casket. The body and top of the casket are then lowered until the ends of the metallic rods have entered the holes made to receive them in the bottom. It is held in that position by small blocks. The dado or depression in the bottom is then supplied with sufficient quantity of the cementing compound, and it is then lowered into place and the nuts tightened. The cement knits the two pieces firmly together where they are held by the rods and nuts. The depression around the nuts on the lower side of the bottom is then filled with the cement, leaving an air-tight, strong, solid artificial-stone casket. The same may be cast in any desired shape, and may be paneled, scrolled, or otherwise ornamented upon the face of the casting, and may be grained, stained, painted, or enameled, as may be desired. This system will also be useful in morgues and other places where it is desired to preserve bodies of the dead for identification.

Having now described my invention, what I desire to secure by Letters Patent, and what I therefore claim, is—

1. In a burial system of the character described, the process of preparing a corpse upon a board and packing the same with fiber saturated with an oily substance, substantially as and for the purposes specified.

2. In a burial system of the character described, the process of preparing a corpse on a board and packing the same in a natural position with fiber saturated with glycerine, substantially as described.

3. In a burial system of the character described, the process of preparing and packing the corpse, as described, and then surrounding the same with a cementing compound of sugar and other cement, substantially as described.

4. In a burial system of the character described, the process of laying out the corpse and bolstering it up and packing it with saturated fiber and providing the head with a removable shield, and then sealing the corpse within a packing of cement except around the head, which is provided with the removable shield during the process of casting, substantially as described.

In testimony that I claim the above as my invention I hereunto set my hand and affix my seal in presence of two witnesses.

JOHN T. BRAUND. [L. S.]

Witnesses:
  JOHN VANDERWERP,
  WM. CARPENTER.